(12) United States Patent
Zaki

(10) Patent No.: US 8,061,226 B2
(45) Date of Patent: Nov. 22, 2011

(54) SYSTEM AND METHOD FOR CLOSED LOOP GYROSCOPE STABILIZATION

(75) Inventor: Ahmed Zaki, Kingston, RI (US)

(73) Assignee: KVH Industries, Inc., Middletown, RI (US)

( * ) Notice: Subject to any disclaimer, the term of this patent is extended or adjusted under 35 U.S.C. 154(b) by 842 days.

(21) Appl. No.: 12/131,416

(22) Filed: Jun. 2, 2008

(65) Prior Publication Data

US 2009/0293651 A1   Dec. 3, 2009

(51) Int. Cl.
*G01C 19/30* (2006.01)
(52) U.S. Cl. ........................................ 74/5.47
(58) Field of Classification Search ............... 74/5.22, 74/5.4, 5.47, 5 R
See application file for complete search history.

(56) References Cited

U.S. PATENT DOCUMENTS

| | | | | |
|---|---|---|---|---|
| 2,940,320 A * | 6/1960 | Young et al. | ...................... | 74/5.4 |
| 4,596,989 A | 6/1986 | Smith et al. | | |
| 5,517,204 A * | 5/1996 | Murakoshi et al. | ........... | 343/765 |
| 5,592,176 A | 1/1997 | Vickers et al. | | |
| 5,670,967 A * | 9/1997 | Sarjala | ........................... | 343/757 |
| 6,789,437 B2 * | 9/2004 | Wyse | ................................ | 74/5.4 |
| 6,859,185 B2 * | 2/2005 | Royalty | ........................ | 343/757 |

* cited by examiner

*Primary Examiner* — Dirk Wright
(74) *Attorney, Agent, or Firm* — John T. Whelan

(57) ABSTRACT

A device for use with a gyroscopic stabilizer for use in an assembly that is moveably connected to a vehicle. The gyroscopic stabilizer has a gyroscope, a skew motor, and a skew motor velocity servo-control system. The gyroscopic stabilizer can control a skew of the assembly based on a torque signal to maintain the assembly in an intended position. The skew motor velocity servo-control system can control the skew motor. The skew motor can move the gyroscope. The gyroscope can provide the torque signal. The device comprises an assembly position determining system, a detector, a state estimator and an output portion. The assembly position determining system can generate an assembly position signal based on one of a position of the assembly, a position of the gyroscopic stabilizer, a position of the gyroscope, a position of the skew motor and a position of the skew motor velocity servo-control system. The detector can detect a skew of one of the assembly, the gyroscopic stabilizer, the gyroscope, the skew motor and the skew motor velocity servo-control system and to generate a skew signal. The state estimator can provide an error signal based on the skew signal. The output portion can provide an output signal to the gyroscopic stabilizer. The output signal is based on the assembly position signal and the error signal.

16 Claims, 4 Drawing Sheets

SYSTEM AND METHOD FOR CLOSED LOOP GYROSCOPE STABILIZATION

BACKGROUND

Vehicle mounted directional antenna systems, especially for satellite applications, must maintain a stable heading while accounting for perturbations caused by unsteady vehicle motion, changes in the bearing of the target of the directional antenna system as caused by movement of the vehicle or the target and a motion caused by a bias in the operation of the gyroscopic stabilizer.

Current antenna systems stabilize an antenna based on directly detecting the motion of the vehicle and then using this information as it relates to the antenna system mounted to the vehicle. These antennas must be carefully aligned with the vehicle so that the detected vehicle motion can be accurately passed to the antenna.

Another alternative to the previously mentioned antenna setup involves an external heading and attitude reference system for the antenna. This method also requires careful alignment of the antenna in addition to significant cost and slow operation.

What is needed is a low-cost, fast, accurate stabilization system that can compensate for unsteady vehicle motion, changes in the bearing of the target of the directional antenna system as caused by movement of the vehicle or the target and a motion caused by a bias in the operation of the gyroscopic stabilizer and that can be used independent of the vehicle to which the antenna is mounted.

BRIEF SUMMARY

It is an object of the present invention to provide a low-cost, fast, accurate stabilization system that can compensate for unsteady vehicle motion, changes in the bearing of the target of the directional antenna system as caused by movement of the vehicle or the target and a motion caused by a bias in the operation of the gyroscopic stabilizer and that can be used independent of the vehicle to which the antenna is mounted.

In accordance with an aspect of the present invention, a device may be used with a gyroscopic stabilizer for use in an assembly that is moveably connected to a vehicle. The gyroscopic stabilizer has a gyroscope, a skew motor, and a skew motor velocity servo-control system. The gyroscopic stabilizer can control a skew of the assembly based on a torque signal to maintain the assembly in an intended position. The skew motor velocity servo-control system can control the skew motor. The skew motor can move the gyroscope. The gyroscope can provide the torque signal. The device comprises an assembly position determining system, a detector, a state estimator and an output portion. The assembly position determining system can generate an assembly position signal based on one of a position of the assembly, a position of the gyroscopic stabilizer, a position of the gyroscope, a position of the skew motor and a position of the skew motor velocity servo-control system. The detector can detect a skew of one of the assembly, the gyroscopic stabilizer, the gyroscope, the skew motor and the skew motor velocity servo-control system and to generate a skew signal. The state estimator can provide an error signal based on the skew signal. The output portion can provide an output signal to the gyroscopic stabilizer. The output signal is based on the assembly position signal and the error signal.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

An exemplary system 100 in accordance with the present invention will now be described with reference to FIGS. 1-4.

Figure 1:
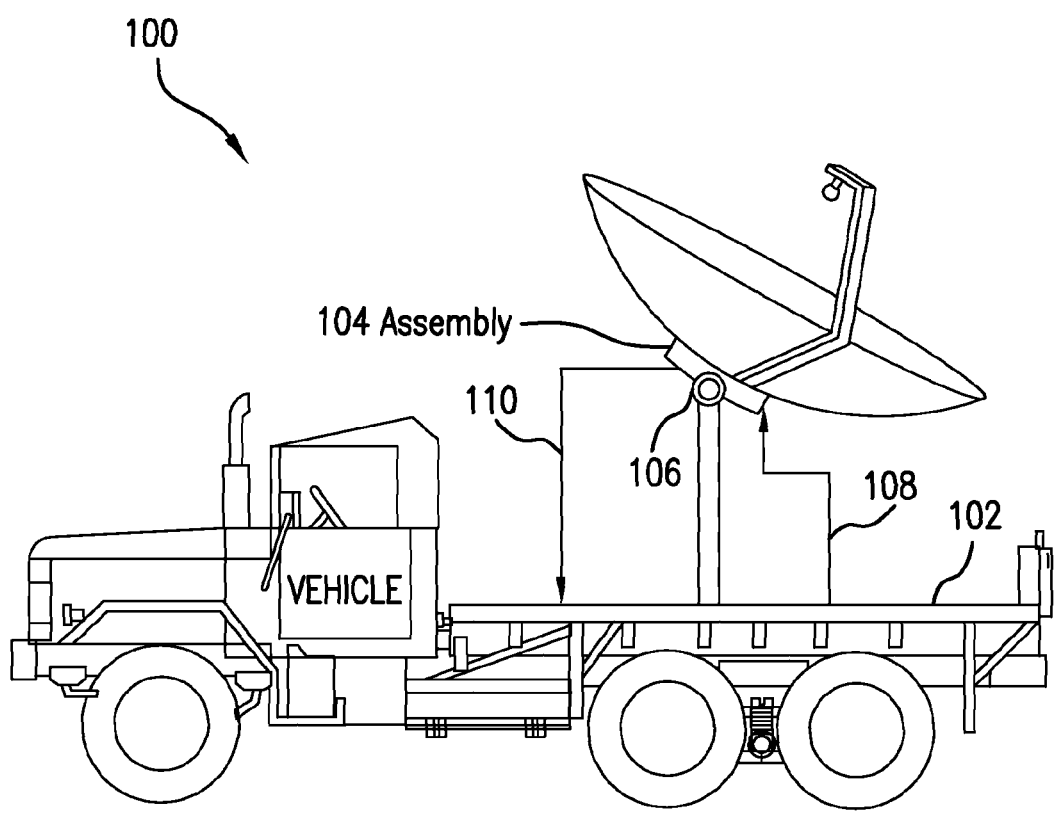
FIG. 1 illustrates a possible deployment of an exemplary embodiment of the present invention wherein an assembly is moveably connected to a vehicle.

As illustrated in FIG. 1, system 100 includes a vehicle 102 and an assembly 104. Assembly 104 is movably connected to vehicle 104 about an axis 106. In an exemplary working embodiment, vehicle 102 is a satellite and assembly 104 is an antenna.

Figure 2:
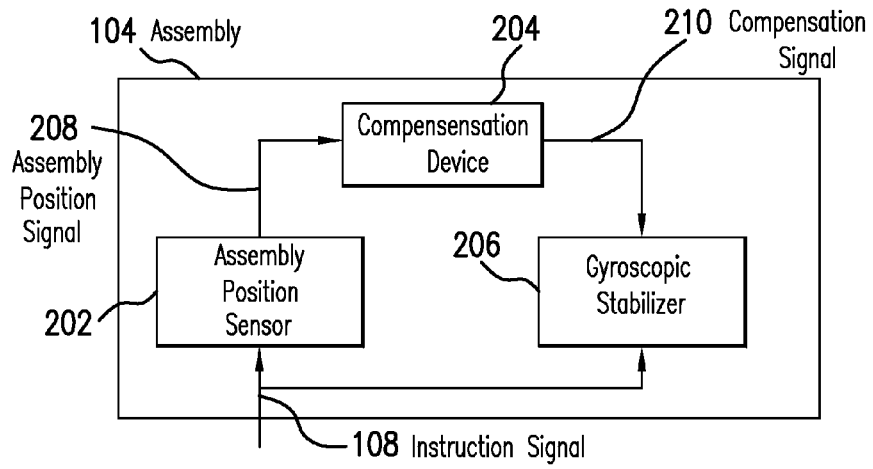
FIG. 2 illustrates an exemplary assembly for use with an exemplary embodiment of the present invention.

FIG. 2 is an exploded view of assembly 104 in accordance with an exemplary embodiment of the present invention. Assembly 104 includes an assembly position sensor 202, a compensation device 204 and a gyroscopic stabilizer 206.

In this embodiment, assembly position sensor 202 may be any known device that is operable to determine a position of assembly 104 and to receive instruction signal 108 from vehicle 102. Of course, in other embodiments, intermediate circuitry may be included between assembly position sensor 202 and vehicle 102 to modify instruction signal 108. Non-limiting examples of intermediate circuitry include matching networks, amplifiers, fillers, resistors, etc. In other embodiments, assembly position sensor 202 may be any known device that is operable to determine a position of any one of assembly 104, assembly position sensor 202, compensation device 204, gyroscopic stabilizer 206 or portions thereof. A non-limiting example of a known position detector includes a global positioning system. In this embodiment, assembly position sensor 202 may be further capable of generating an assembly position signal 208 based on the detected position of assembly 104. Of course in other embodiments, assembly position sensor 202 may be further capable of generating an assembly position signal 208 based on the detected position of any one of assembly 104, assembly position sensor 202, compensation device 204, gyroscopic stabilizer 206 or portions thereof.

In this embodiment, compensation device 204 is operable to receive assembly position signal 208 from assembly position sensor 202. Of course, in other embodiments, intermediate circuitry may be included between compensation device 204 and assembly position sensor 202 to modify assembly position signal 208. Non-limiting examples of intermediate circuitry include matching networks, amplifiers, filters, resistors, etc. Compensation device 204 is further operable to generate a compensation signal 210 based on assembly position signal 208.

In this embodiment, gyroscopic stabilizer 206 is operable to receive compensation signal 210 from compensation device 204 and to receive instruction signal 108 from vehicle 102. Of course, in other embodiments, intermediate circuitry may be included between gyroscopic stabilizer 206 and compensation device 204 to modify compensation signal 210. Similarly, in some embodiments, intermediate circuitry may be included between gyroscopic stabilizer 206 and vehicle 102 to modify instruction signal 108. Non-limiting examples of intermediate circuitry include matching networks, amplifiers, filters, resistors, etc.

Figure 3:
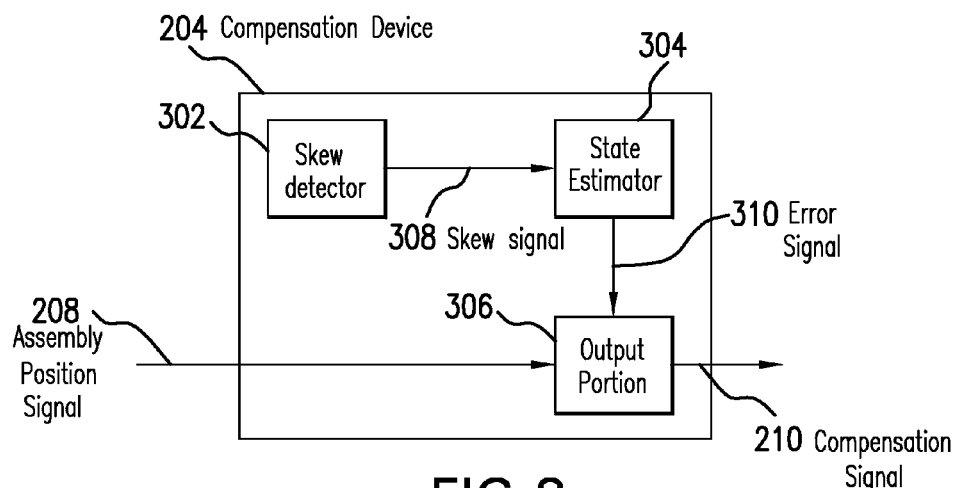
FIG. 3 illustrates a gyroscopic stabilizer for use with an exemplary embodiment of the present invention.

FIG. 3 is an exploded view of compensation device 204 in accordance with an exemplary embodiment of the present invention. Compensation device 204 includes a skew detector 302, a state estimator 304 and an output portion 306.

In this embodiment, skew detector 302 is operable to detect a skew of assembly 104. Of course, in other embodiments, skew detector 302 is operable to detect a skew of at least one of assembly 104, gyroscopic stabilizer 206 and portions thereof. Skew detector 302 is further operable to generate a skew signal 308 based on the detected skew.

In this embodiment, state estimator 304 is operable to receive skew signal 308 from skew detector 302. Of course, in other embodiments, intermediate circuitry may be included between state estimator 304 and skew detector 302 to modify skew signal 308. Non-limiting examples of intermediate circuitry include matching networks, amplifiers, filters, resistors, etc. State estimator 304 is further operable to generate an error signal 310 based on skew signal 308.

In this embodiment, output portion 306 is operable to receive error signal 310 from state estimator 304 and to receive assembly position signal 208 from assembly position sensor 202. Of course, in other embodiments, intermediate circuitry may be included between output portion 306 and state estimator 304 to modify error signal 310 and intermediate circuitry may be included between output portion 306 and assembly position sensor 202 to modify assembly position signal 208. Non-limiting examples of intermediate circuitry include matching networks, amplifiers, filters, resistors, etc. Output portion 306 is further operable to generate compensation signal 210 based on error signal 310 and assembly position signal 208.

Figure 4:
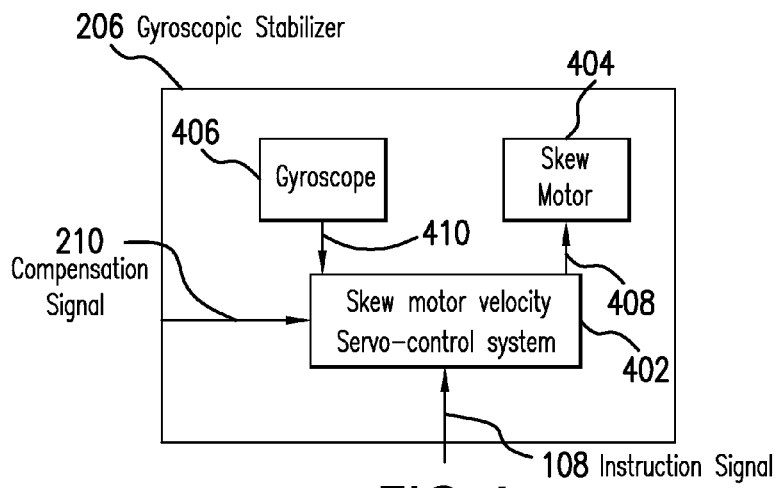
FIG. 4 illustrates an exemplary embodiment of the present invention.

FIG. 4 is an exploded view of gyroscopic stabilizer 206 in accordance with an exemplary embodiment of the present invention. Gyroscopic stabilizer 206 includes a skew motor velocity servo-control system 402, a skew motor 404 and a gyroscope 406.

In this embodiment, skew motor velocity servo-control system 402 is operable to receive compensation signal 210 from compensation device 204, to receive instruction signal 108 from vehicle 102 and to receive torque signal 410 from gyroscope 406. Of course, in other embodiments, intermediate circuitry may be included between skew motor velocity servo-control system 402 and compensation device 204 to modify compensation signal 210 and intermediate circuitry may be included between skew motor velocity servo-control system 402 and gyroscope 406 to modify torque signal 410. Non-limiting examples of intermediate circuitry include matching networks, amplifiers, filters, resistors, etc. Skew motor velocity servo-control system 402 is further operable to generate a skew motor control signal 408 based on compensation signal 210 and torque signal 410, which will be described below.

In this embodiment, skew motor 404 is operable to receive skew motor control signal 408 from skew motor velocity servo-control system 402. Of course, in other embodiments, intermediate circuitry may be included between skew motor 404 and skew motor velocity servo-control system 402 to modify skew motor control signal 408. Non-limiting examples of intermediate circuitry include matching networks, amplifiers, filters, resistors, etc.

In this embodiment, gyroscope 406 is operable to detect a skew of assembly 104. Of course, in other embodiments, gyroscope 406 is operable to detect a skew of at least one of assembly 104, gyroscopic stabilizer 206, skew motor velocity servo control system 402, skew motor 404 or gyroscope 406. Gyroscope 406 is further operable to generate torque signal 410 based on the detected skew.

In operation, vehicle 102 instructs assembly 104 to direct itself at a target specified in instruction signal 108. Assembly position sensor 202 compares the current position of assembly 104 to the position of the target specified by instruction signal 108 to generate assembly position signal 208, which is sent to compensation device 204. Gyroscopic stabilizer 206 maintains stability based on instruction signal 108. Assembly position signal 208 is the first part of a command to update the position of assembly 104.

Referring back to FIG. 3, in an exemplary embodiment, skew detector 302 comprises a tilt sensor and/or accelerometer and is used to detect the direction and magnitude of movement of assembly 104. The direction and magnitude of the movement of assembly 104 provide the bases for skew signal 308.

In an exemplary embodiment, state estimator 304 comprises a Kalman filter and is used to generate error signal 310, which compensates for movement of assembly 104 as detected by skew detector 302. Error signal 310 is the second part of the command to update the position of assembly 104.

An output of a mechanical or electrical system, as a function of its input, may be mathematically modeled based on the interaction of the various states of components within the system. However, actual implementation of such a system may yield a different output function. The difference from theory to application may be based on many subtle physical parameters for the system that were not taken into account in the mathematical model. State estimator 304 compensates for such difference by estimating a state of the system (typically the expected mathematically modeled state), by measuring the actual state and self-adjusting operating parameters in a feedback system to compensate for differences in the estimated state and the measured state. A Kalman filter is a very good state estimator.

The Kalman filter is a solution to the recursive linear minimum mean-square estimation problem. It minimizes the mean square error estimation problem between the estimates and actual measurements as long as the system is modeled accurately. The process of state estimation in the Kalman filter context comprises two parallel cycles. The final estimation of the state is calculated from the predicted state, innovation, and Kalman filter gain. The Kalman gain can be considered as a correction factor on the final estimate.

During the recursive estimation of the state, the Kalman gain reaches a steady-state value determined by a pre-selected and assumed constant process noise covariance matrices, Q and R respectively. If the process and noise covariance matrices are not set properly, the correction by the Kalman gain will not be suitable and an estimation error will be developed. Hence, Q and R values should be verified by extensive simulation.

In an exemplary embodiment, the R matrix can be weighted to compensate for the linear acceleration under dynamic motion, e.g., the tilt measurement will be used when the acceleration out of a 3-axis sensor will be within:

$$1.05 \geq a = (a_x^2 + a_y^2 + a_z^2) \geq 0.95.$$

This way, the tilt measurements are discarded if the linear acceleration is large. The state and measurements equations are as follows:

$$\square(t) = \delta\omega_x(t) + \text{Noise}$$

$$\Gamma(t) = Y(t) + \text{Noise},$$

where $\omega_z(t)$ is the drift of the gyroscope, $\delta\omega_z(t)$ is the gyroscope bias, $Y(t)$ is the skew roll component, $\sqcap(t)$ is the derivative of the skew roll component (or pitch), and $\Gamma(t)$ is the tilt sensor roll component (or pitch).

Output portion 306 combines error signal 310, for example as generated by the Kalman filter used in state estimator 304 and position signal 208 to create compensation signal 210. Compensation signal 210 is output to gyroscopic stabilizer 206.

Now referring back to FIG. 4, gyroscope 406 is capable of detecting a change in the position of assembly 104 and generates torque signal 410 based on the change in position. Torque signal 410 is the third and, in this embodiment, final component of the command to update the position of assembly 104. Skew motor velocity servo-control system 402 combines torque signal 410 and compensation signal 210 to generate skew motor control signal 408, which is a combination of the three commands to update the position of assembly 104 from position sensor 202, state estimator 304, and gyroscope 406. Skew motor control signal 408 is interpreted by skew motor 404, which changes the position of assembly 104.

As described above, assembly 104 is stabilized by two control loops. The first, inner, control loop uses gyroscope 406 to detect movement by assembly 104, which can be quickly compensated for by skew motor velocity servo-control system 402. Gyroscope 406 is incapable of detecting certain movements of assembly 104, including linear motion. To account for these undetected motions, a second, outer, control loop uses skew detector 302 to detect other motions of assembly 104 and state estimator 304 to estimate a skew for assembly 104 which is sent through output portion 306 to skew motor velocity servo-control system 402. Skew motor velocity servo-control system 402 uses compensation signal 210 from output portion 306 to generate a command for skew motor 404. The commanded position for the control loops is generated by position sensor 202.

Figure 5A:
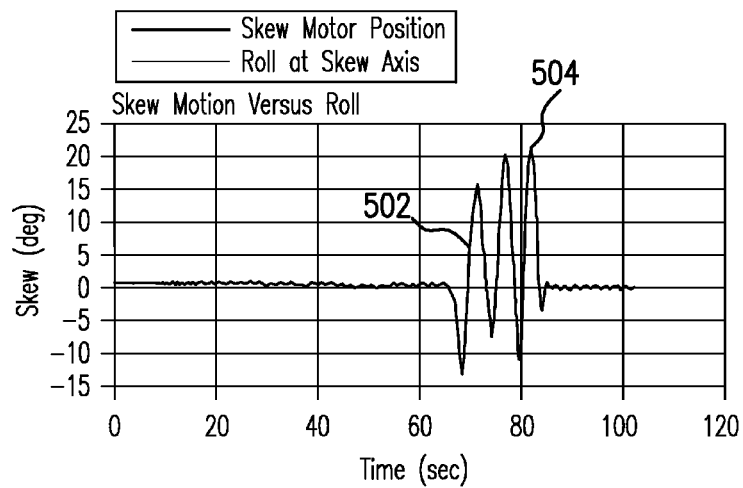
FIGS. 5A-5C illustrate graphical results of testing an exemplary embodiment of the present invention.
Figure 5B:
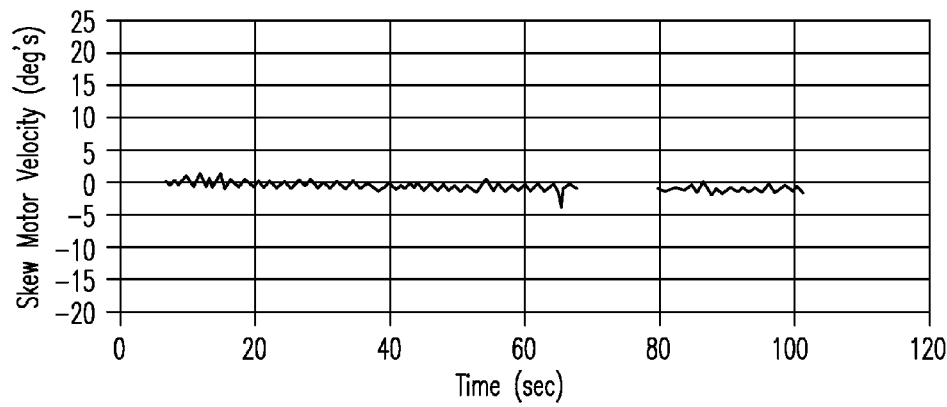
Figure 5C:
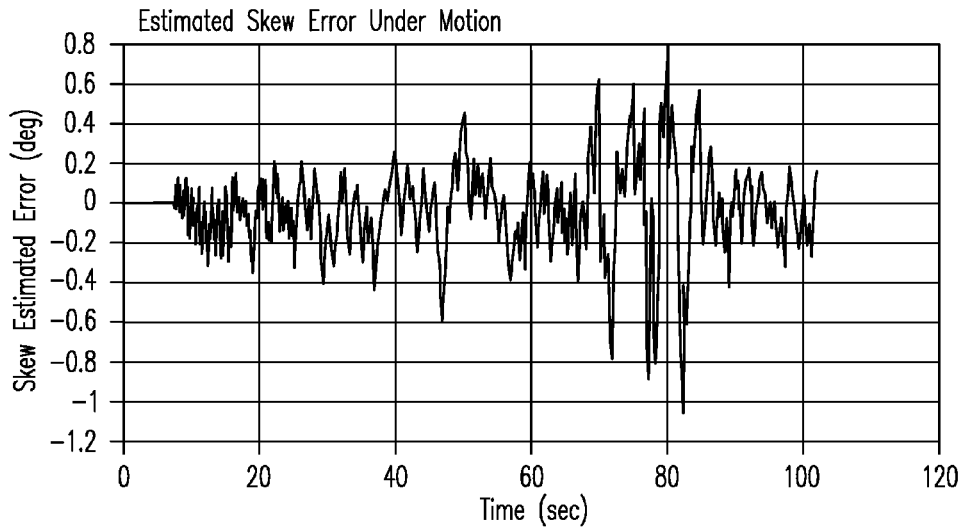

The results of the application of this method of assembly stabilization can be seen in FIGS. 5A-5C. FIG. 5A is a graph illustrating the skew motor position 502 function versus the estimated roll function 504 from the Kalman filter. FIG. 5B is a graph illustrating the skew motor velocity (in degree/seconds) as a function of time and FIG. 5C is a graph illustrating the estimates skew error in degrees as a function of time. These results demonstrate that the system is fast and stable.

Figure 6:
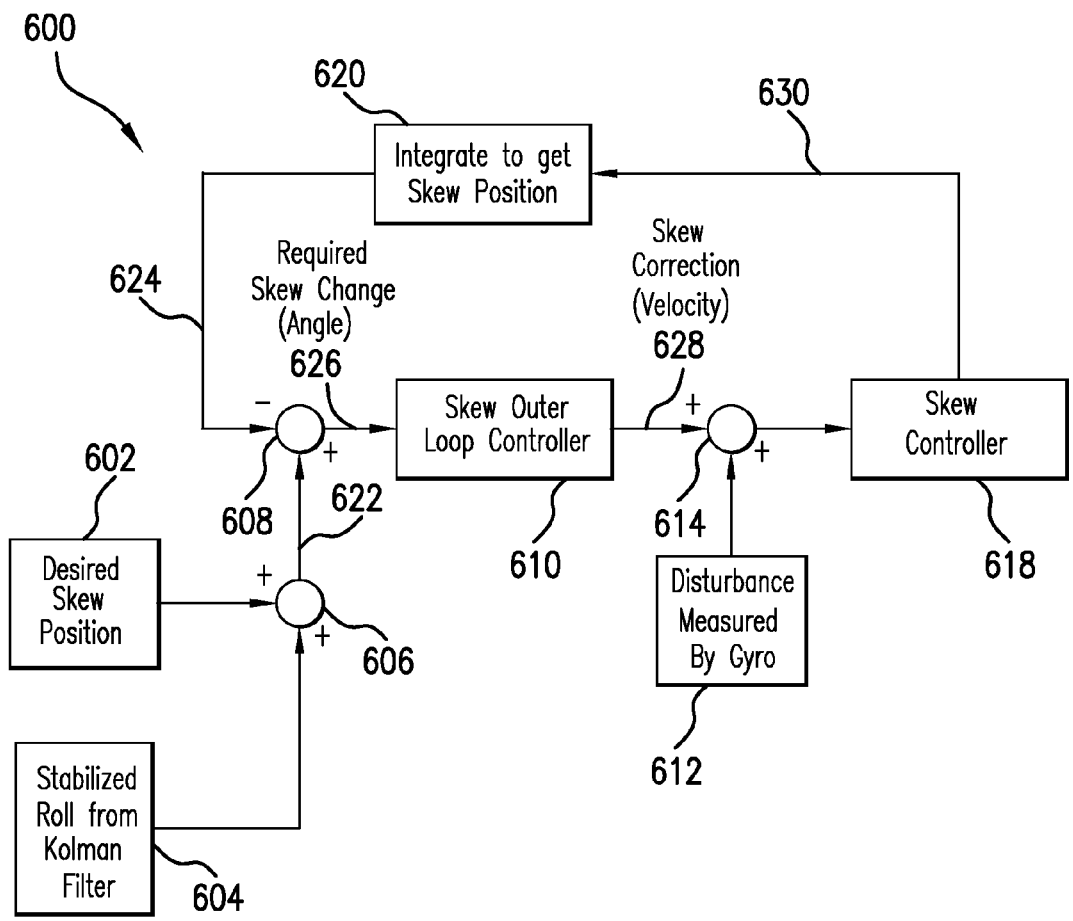
FIG. 6 illustrates a control loop for an exemplary embodiment of the present invention.

An exemplary control loop 600 for assembly 104 is illustrated in FIG. 6. As illustrated in the figure, control loop 600 includes a desired skew position signal 602, a stabilized roll signal 604 from state estimator 304, an adder 606, an adder 608, a skew motor outer loop controller 610, a disturbance signal 612 measured by gyroscope 406, an adder 614, a skew controller 618 and an integrator 620.

In operation, outside of control loop 600, desired skew position signal 602 and stabilized roll signal 604 are combined by adder 606 to generate a target relative skew signal 622. Integrator 620 generates a skew motor position signal 624, indicating the position of skew motor 404. Target relative skew signal 622 is combined with skew motor position signal 624 via adder 608. Adder 608 generates a required skew angle adjustment signal 626, which is sent to skew motor outer loop controller 610. Skew motor outer loop controller 610 outputs a skew correction velocity signal 628 to adder 614. Skew correction-velocity signal 628 is combined with disturbance signal 612 via adder 614. Skew controller 618, receives the output from adder 614 and generates a skew velocity command signal 630 to adjust assembly 104. Integrator 600 integrates skew velocity command signal 630 to generate a skew position, which is output to adder 602, closing the loop.

Figure 7:
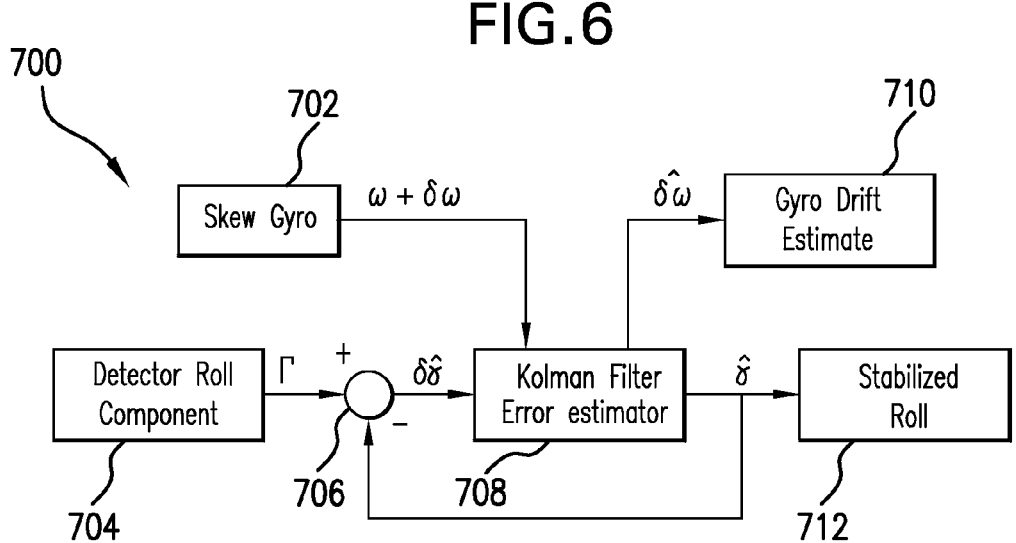
FIG. 7 illustrates an exemplary Kalman filter as used with an exemplary embodiment of the present invention.

FIG. 7 illustrates an exemplary Kalman filter 700 as used as state estimator 304, in an exemplary embodiment of the present invention. As illustrated in the figures, Kalman filter 700 includes a skew gyroscope component 702 that detects a skew of assembly 104 and generates a skew signal $\omega+\delta\omega$, a detector roll component 704 that detects a roll of assembly 104 and generates a roll signal $\Gamma$, an adder 706, a Kalman filter error estimator 708 that estimates a roll and gyroscope bias drift of assembly 104 and generates an estimated roll signal $\gamma$ and an estimated gyroscope bias drift $\delta\omega$, a gyroscope drift estimate component 710 and a stabilized roll component 712.

In operation, Kalman filter error estimator 708 takes as input, skew signal $\omega+\delta\omega$ and a skew estimate error signal $\delta\gamma$ from adder 704. Skew signal $\omega+\delta\omega$ detected by gyroscope component 702 is measured as a velocity, which is a combination of the actual skew velocity $\omega$ plus a bias $\delta\omega$ of gyroscope 406. Estimated roll signal $\gamma$ from Kalman filter error estimator 708 is used as stabilized roll component 712 and is also fed back to adder 706. Adder 706 subtracts signal $\gamma$ from roll signal $\Gamma$ to generate a skew estimate error signal $\delta\gamma$.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a gyroscopic stabilizer for use in an assembly that is moveably connected to a vehicle, the gyroscopic stabilizer having a gyroscope, a skew motor, and a skew motor velocity servo-control system, the gyroscopic stabilizer being operable to control a skew of the assembly based on a torque signal to maintain the assembly in an intended position, the skew motor velocity servo-control system being operable to control the skew motor, the skew motor being operable to move the gyroscope, the gyroscope being operable to provide the torque signal, said device comprising:
   an assembly position determining system operable to generate an assembly position signal based on one of a position of the assembly, a position of the gyroscopic stabilizer, a position of the gyroscope, a position of the skew motor and a position of the skew motor velocity servo-control system;

a detector operable to detect a skew of one of the assembly, the gyroscopic stabilizer, the gyroscope, the skew motor and the skew motor velocity servo-control system and to generate a skew signal;

a state estimator operable to provide an error signal based on the skew signal; and an output portion operable to provide an output signal to the gyroscopic stabilizer, wherein the output signal is based on the assembly position signal and the error signal.

2. The device of claim 1, wherein said state estimator comprises a recursive filter.

3. The device of claim 2, wherein said recursive filter comprises a Kalman filter.

4. The device of claim 1, wherein said detector comprises an accelerometer.

5. The device of claim 1, wherein said output portion comprises an adder operable to add the assembly position signal to the error signal.

6. An assembly for moveable connection to a vehicle, said assembly comprising:
a body;
a gyroscopic stabilizer on said body;
an assembly position determining system on said body;
a detector on said body;
a state estimator on said body; and
an output portion,
wherein said gyroscopic stabilizer comprises a gyroscope, a skew motor, and a skew motor velocity servo-control system, said gyroscopic stabilizer is operable to control a skew of said body based on a torque signal to maintain said body in an intended position, said skew motor velocity servo-control system being operable to control said skew motor, said skew motor being operable to move said gyroscope, said gyroscope being operable to provide the torque signal;

an assembly position determining system operable to generate an assembly position signal based on one of a position of said body; a position of said gyroscopic stabilizer, a position of said gyroscope, a position of said skew motor and a position of said skew motor velocity servo-control system;

a detector operable to detect a skew of one of said body, said gyroscopic stabilizer, said gyroscope, said skew motor and said skew motor velocity servo-control system and to generate a skew signal;

a state estimator operable to provide an error signal based on the skew signal; and an output portion operable to provide an output signal to said gyroscopic stabilizer, wherein the output signal is based on the assembly position signal and the error signal.

7. The assembly of claim 6, wherein said state estimator comprises a recursive filter.

8. The assembly of claim 7, wherein said recursive filter comprises a Kalman filter.

9. The assembly of claim 6, wherein said detector comprises an accelerometer.

10. The assembly of claim 6, wherein said output portion comprises an adder operable to add the assembly position signal to the error signal.

11. A system comprising:
a vehicle;
an assembly moveably connected to said vehicle;
gyroscopic stabilizer comprising a gyroscope, a skew motor, and a skew motor velocity servo-control system, said gyroscopic stabilizer being operable to control a skew of said assembly based on a torque signal to maintain said assembly in an intended position, said skew motor velocity servo-control system being operable to control said skew motor, said skew motor being operable to move said gyroscope, said gyroscope being operable to provide the torque signal;

an assembly position determining system operable to generate an assembly position signal based on one of a position of said assembly, a position of said gyroscopic stabilizer, a position of said gyroscope, a position of said skew motor and a position of said skew motor velocity servo-control system;

a detector operable to detect a skew of one of said assembly, said gyroscopic stabilizer, said gyroscope, said skew motor and said skew motor velocity servo-control system and to generate a skew signal;

a state estimator operable to provide an error signal based on the skew signal; and an output portion operable to provide an output signal to said gyroscopic stabilizer, wherein the output signal is based on the assembly position signal and the error signal.

12. The device of claim 11, wherein said state estimator comprises a recursive filter.

13. The device of claim 12, wherein said recursive filter comprises a Kalman filter.

14. The device of claim 11, wherein said detector comprises an accelerometer.

15. The device of claim 11, wherein said output portion comprises an adder operable to add the assembly position signal to the error signal.

16. A method of stabilizing an assembly that is moveably connected to a vehicle, said method comprising:
controlling, via a gyroscopic stabilizer comprising a gyroscope, a skew motor, and a skew motor velocity servo-control system, a skew of the assembly based on a torque signal to maintain the assembly in an intended position, generating an assembly position signal based on one of a position of the assembly, a position of the gyroscopic stabilizer, a position of the gyroscope, a position of the motor and a position of the skew motor velocity servo-control system;

detecting a skew of one of the assembly, the gyroscopic stabilizer, the gyroscope, the skew motor and the skew motor velocity servo-control system;

generating a skew signal;

providing an error signal based on the skew signal; and providing an output signal to the gyroscopic stabilizer, wherein the output signal is based on the assembly position signal and the error signal.

* * * * *